United States Patent [19]
Crowne

[11] Patent Number: 5,814,830
[45] Date of Patent: Sep. 29, 1998

[54] LIQUID GAUGING APPARATUS WITH A MAGNETORESISTIVE SENSOR AND REMOTE SENSOR INTERROGATION

[75] Inventor: David Henry Crowne, Middlebury, N.Y.

[73] Assignee: Simmonds Precision Products, Inc., Akron, Ohio

[21] Appl. No.: 457,085

[22] Filed: Jun. 1, 1995

Related U.S. Application Data

[62] Division of Ser. No. 325,003, Oct. 18, 1994, Pat. No. 5,530,258.

[51] Int. Cl.$^6$ .................................................. G01N 15/06
[52] U.S. Cl. ............................. 250/577; 73/314; 340/623
[58] Field of Search ...................... 250/577, 551, 250/221, 904; 340/870.16, 870.28, 870.37, 870.72, 623; 73/61.41, 314, 305; 338/33

[56] References Cited

U.S. PATENT DOCUMENTS

| | | | |
|---|---|---|---|
| 3,566,384 | 2/1971 | Smith et al. | 340/200 |
| 4,031,513 | 6/1977 | Simciak | 340/152 T |
| 4,119,948 | 10/1978 | Ward et al. | 340/151 |
| 4,313,228 | 1/1982 | Berstein | 455/617 |
| 4,410,020 | 10/1983 | Lorenz | 141/65 |
| 4,420,976 | 12/1983 | Orloff et al. | 73/304 C |
| 4,524,282 | 6/1985 | King | 250/577 |
| 4,804,944 | 2/1989 | Golladay et al. | 340/624 |
| 4,841,227 | 6/1989 | Maier | 324/61 R |
| 4,918,979 | 4/1990 | Pearce et al. | 73/61.1 R |
| 4,963,729 | 10/1990 | Spillman et al. | 250/227.21 |
| 4,988,975 | 1/1991 | Nap | 340/450.3 |
| 5,020,367 | 6/1991 | White | 73/319 |
| 5,075,631 | 12/1991 | Patriquin | 324/660 |
| 5,077,527 | 12/1991 | Patriquin | 324/660 |
| 5,078,010 | 1/1992 | Lock | 73/304 R |
| 5,111,407 | 5/1992 | Galpern | 364/483 |
| 5,119,679 | 6/1992 | Frisch | 73/705 |
| 5,134,282 | 7/1992 | Sargoytchev | 250/227.21 |
| 5,150,615 | 9/1992 | Rymut et al. | 73/313 |
| 5,253,521 | 10/1993 | Abramovich et al. | 73/306 |
| 5,321,229 | 6/1994 | Holling et al. | 219/448 |

FOREIGN PATENT DOCUMENTS

| | | |
|---|---|---|
| 0376646A3 | 12/1989 | European Pat. Off. . |
| 0397338A1 | 4/1990 | European Pat. Off. . |

Primary Examiner—Que Le
Attorney, Agent, or Firm—Leonard L. Lewis; William E. Zitelli

[57] ABSTRACT

A liquid gauging system for a liquid container, the system comprising sensor means for producing a first electromagnetic signal that corresponds to liquid quantity in the container, and remote interrogation means for receiving the first electromagnetic signal and producing a system output that corresponds to the liquid quantity; the sensor means being energized by a second electromagnetic signal transmitted by the remote interrogation means.

9 Claims, 4 Drawing Sheets

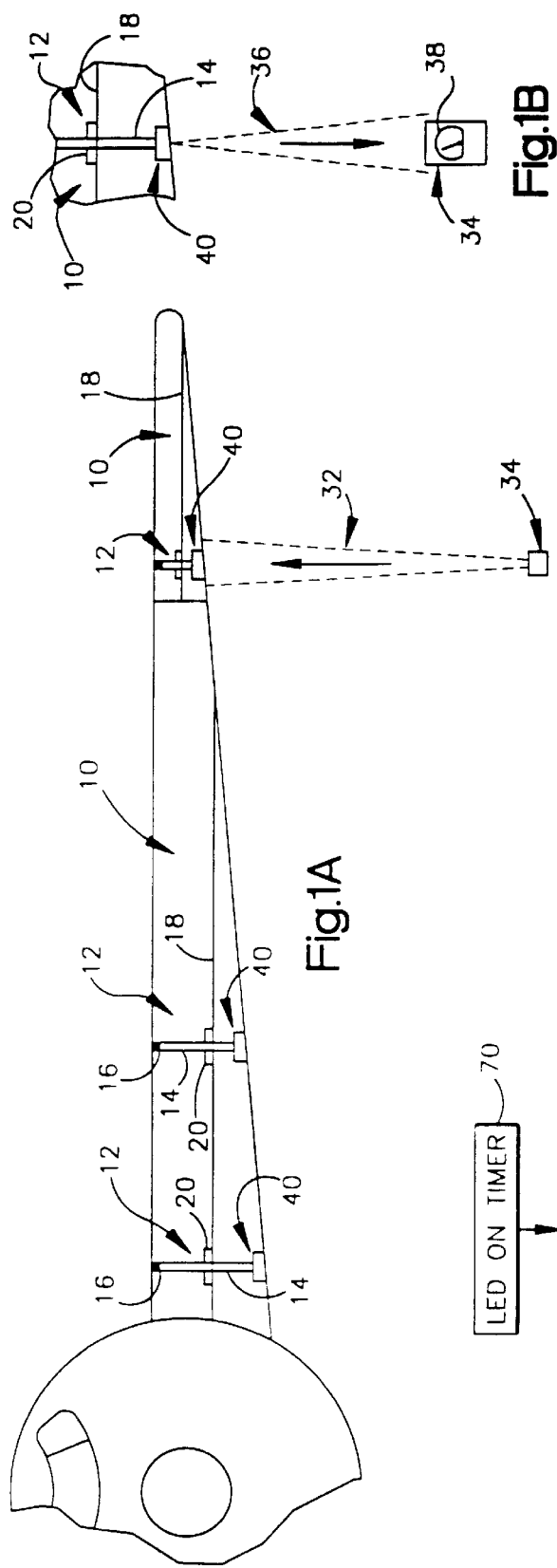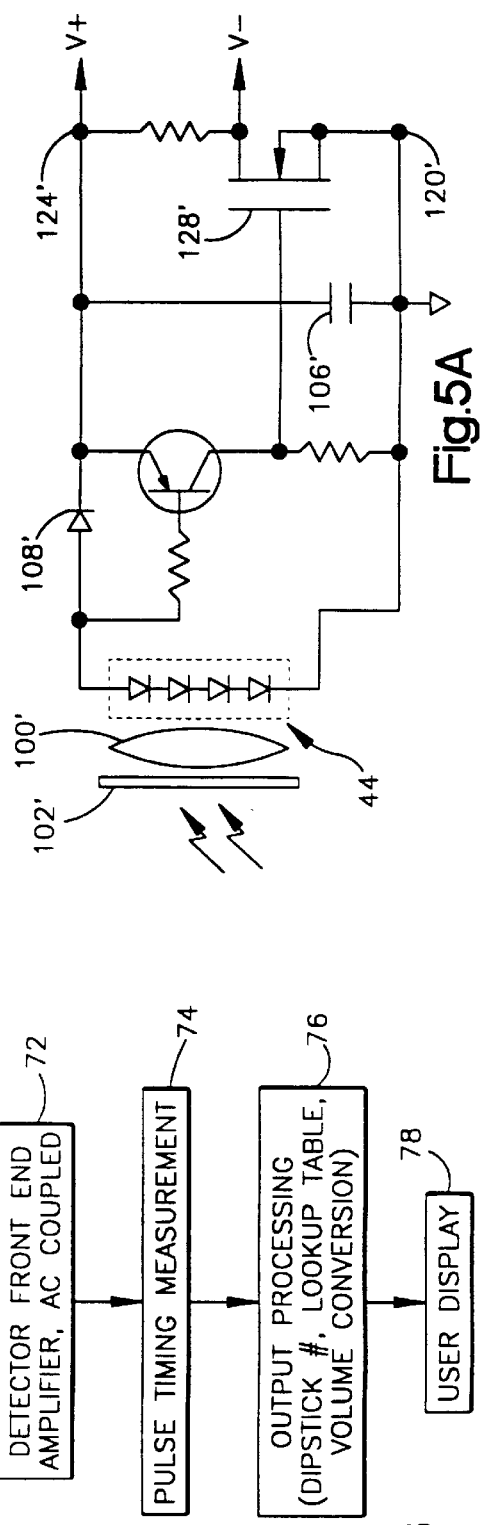

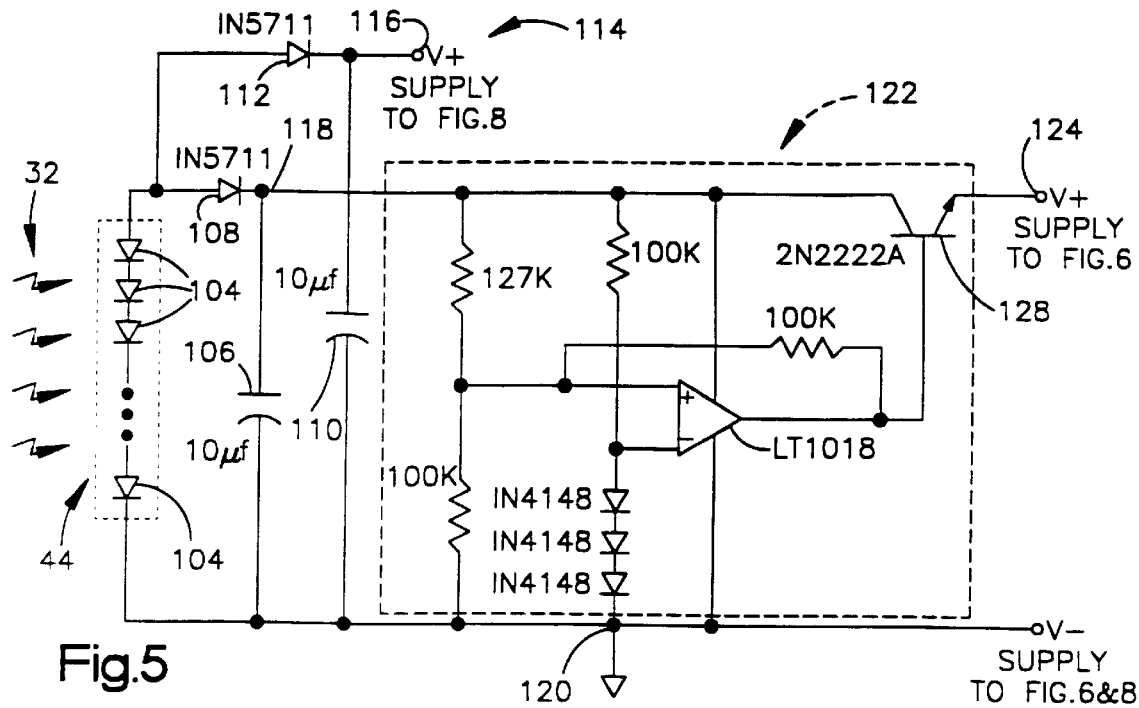
Fig.5
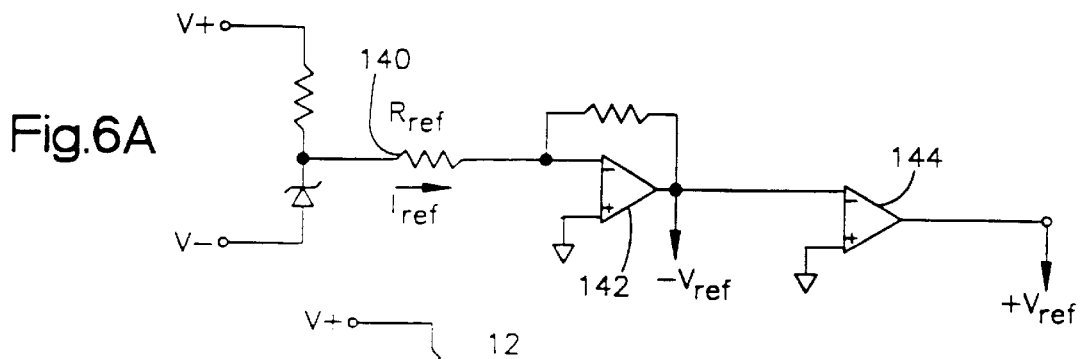
Fig.6A
Fig.6B
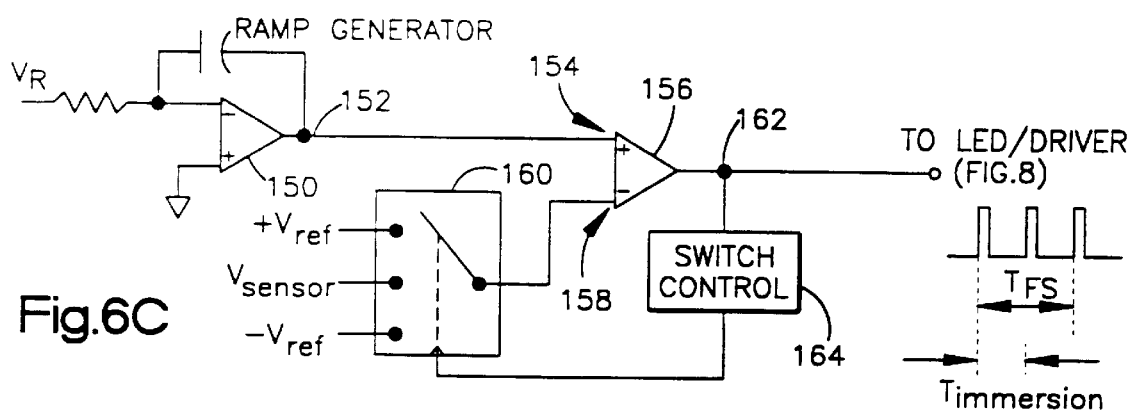
Fig.6C

LIQUID GAUGING APPARATUS WITH A MAGNETORESISTIVE SENSOR AND REMOTE SENSOR INTERROGATION

This is a divisional of pending application Ser. No. 08/325,003 filed Oct. 18, 1994, now U.S. Pat. No. 5,530,258.

BACKGROUND OF THE INVENTION

The invention relates to apparatus and methods for liquid gauging, and more particularly to apparatus and methods for remotely interrogating liquid quantity sensors.

Many types of liquid quantity and level sensors are known, including capacitive sensors, resistive sensors, acoustic sensors and so forth. Passive sensors generally operate on the basis of a sensor element that exhibits a parameter, e.g. capacitance, that varies with the liquid level. Active sensors such as acoustic sensors operate on the basis of producing a signal, e.g. an acoustic pulse, that can be used to detect the liquid level by parametric analysis such as echo ranging.

Such systems further include an electronic circuit that detects the parametric value of interest and converts that value to a signal that corresponds to the liquid level.

A common application for such liquid level sensors is for fuel level and quantity detection in aircraft fuel tanks. However, due to the volatile nature of fuel, it is desirable to minimize the connection of electrical energy to the sensors which may be disposed in the fuel. It is further desirable to minimize the amount of electrical energy stored in the sensors or used by the sensors.

A known approach for minimizing the coupling of electrical energy into a fuel tank is described in U.S. Pat. No. 4,963,729, issued to Spillman et al., and commonly owned by the assignee of the present invention. In this system, optical energy is coupled to the sensors via optic fibers. This optical energy is then converted to electrical energy for energizing the sensors. The sensors detect the liquid level and then transmit another optical signal back to a detector via the optic fibers. The detector then converts the second optical signal into an output that corresponds to liquid level in the tank.

For aircraft applications, on board readings often need to be verified by ground crews, either during routine turn around or to confirm an error reading. The optical fiber link to the internal sensor in the above system prevents as a practical matter interrogation of the sensor by ground crews, other than via the same optic fiber link which may in fact be the cause of a fault reading.

A commonly used fuel level sensor in commercial aircraft particularly is a dripstick sensor, which is used as a backup fuel gauging apparatus to the on-board electronic fuel level sensors. For example, dripstick verification may be needed when a refueling truck gauge disagrees with the aircraft fuel gauge, if the on-board fuel gauges appear to be inaccurate or inoperative, or simply by request of the flight crew, among other possible reasons.

The dripstick includes a linear body that extends vertically into the fuel tanks. Often there is a plurality of such dripsticks in each wing of the aircraft. A magnetic float is disposed on the dripstick body like a collar that floats at the fuel surface. The dripstick is read by the ground crew by manually withdrawing the dripstick from the wing until a magnetic tip at the upper end of the sensor body engages the float. The operator can feel the resistance of the tip against the magnetic float and stop pulling on the dripstick. The dripstick body includes a series of markings which visually indicate to the operator the fuel level based on how far the dripstick was withdrawn from the tank. Although dripstick designs may vary somewhat, the basic operation of manual access and visual interrogation is the same for the ground crew.

Various problems are associated with using the conventional dripsticks, especially the time involved for the ground crew to walk around to all the sensors and manually/visually determine the readings. The mechanic climbs a ladder or uses a lifting device to gain close access to the underside of the wing, withdraws the dripstick until the engagement is detected, records the reading and then replaces the dripstick into the tank. Dripstick design is further complicated by the need for minimal fuel leakage. This entire process must be repeated for each sensor, which adds substantially to the refueling operation and turnaround time for aircraft flight readiness.

Commercial air carriers have long identified the need for a dripstick-like backup system, but one that is easier to use. A system that can be interrogated from the ground would eliminate the need for lifting equipment and provide easier reading of difficult access dripsticks. Overall reduction in refueling and fuel verification delays could then be realized.

The need exists therefore for simple and reliable apparatus and methods to interrogate liquid gauging sensors from a remote, preferably ground level, location without coupling electrical energy into a volatile container. Such an arrangement should also be compatible with current dripstick sensor configurations if desired for a particular application.

SUMMARY OF THE INVENTION

Accordingly, the invention contemplates a liquid gauging system for use with a liquid container, the system comprising sensor means for producing a first electromagnetic signal that corresponds to liquid quantity and/or level in the container, and remote interrogation means for receiving the first electromagnetic signal and producing an output that corresponds to the liquid quantity; the sensor means being energized by a second electromagnetic signal transmitted by the remote interrogation means.

The invention also contemplates the methods for remotely sensing liquid quantity in a container as embodied in such apparatus, as well as a method for remotely detecting liquid quantity and/or level in a container comprising the steps of:

a. producing a first electromagnetic signal and transmitting the first electromagnetic signal to a sensor that produces an output that corresponds to liquid quantity in the container;

b. using the first electromagnetic signal to energize the sensor;

c. producing a second electromagnetic signal that corresponds to liquid quantity in the container; and d. transmitting the second electromagnetic signal to a remote detector for converting the second electromagnetic signal into an output that corresponds to liquid quantity in the container.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 1A is a simplified representation of a liquid quantity gauging system according to the invention, such system being generally shown in an exemplary manner for use with aircraft fuel gauging;

FIG. 1B is an enlarged simplified view of an optics arrangement for the exemplary use depicted in FIG. 1A;

FIG. 3 is a simplified flow chart for operational functions of the system illustrated in FIG. 2;

FIG. 5 is a schematic diagram of an energy conversion and control circuit suitable for use with the present invention, and FIG. 5A is a schematic of an alternative and simpler circuit suitable for use in many applications;

FIG. 6(A, B and C) are schematic diagrams of sensor interface and encoder circuits suitable for use with the invention.

DETAILED DESCRIPTION OF THE INVENTION

Figure 2:
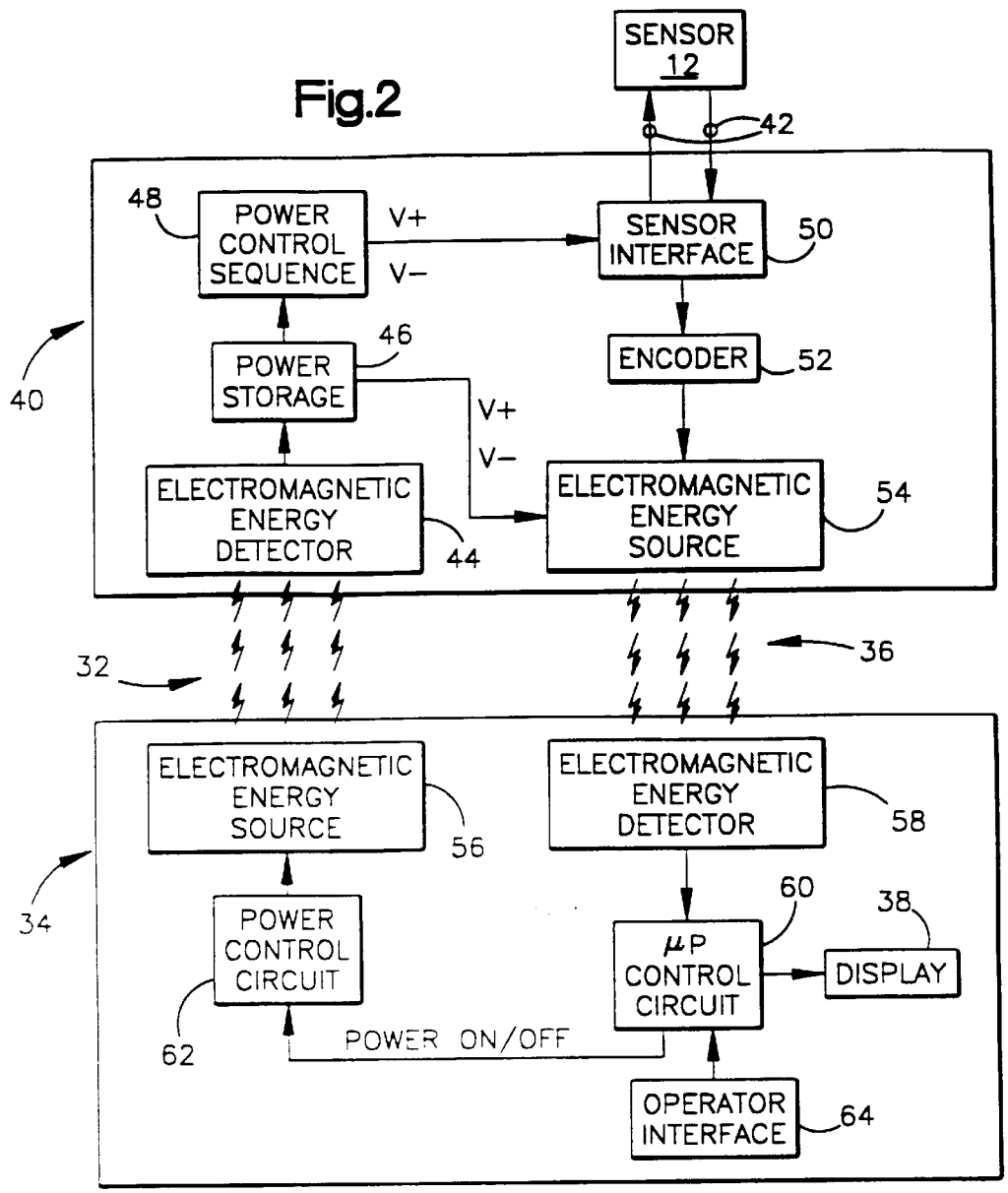
FIG. 2 is a system functional block diagram for a sensor interrogation system and method that uses a remote hand held interrogation unit and electronic control circuit according to a preferred embodiment of the invention.

With reference to FIG. 1A, aircraft, particularly large commercial aircraft, have a plurality of fuel tanks 10 internal to the wing structures. Although the invention is described herein with particular reference to commercial aircraft, this is for purposes of explanation only and should not be construed in a limiting sense. Those skilled in the art will readily appreciate that the invention can conveniently be used with any aircraft or other vehicles or structures that have liquid containers. The invention also is not limited to fuel tank containers of volatile fuel, but can be used for sensing liquid quantity and levels of many fluid types in virtually any container. The particular sensor used for detecting the fuel level/quantity, such as, for example, a magnetoresistive dripstick as described in an exemplary manner herein, is also a matter of design choice. Those skilled in the art will readily appreciate that the advantages and benefits of the invention can be realized using any sensor that produces an electrical output or produces an output or exhibits a characteristic that can be interpreted by electronic circuits including capacitive, resistance, acoustic and so on to name just a few. The terms "liquid level" and "liquid quantity" as used herein are intended to be understood in their broadest sense and are essentially interchangeable terms. As is well known, liquid level data can easily be converted to liquid quantity data, and vice-versa, when the tank or container dimensional characteristics are known. The invention is directed in a broader sense to apparatus and methods for remotely interrogating sensors that produce outputs; and is especially useful with sensors that produce outputs corresponding to liquid quantity and/or level in the fluid container.

In the embodiment described herein, each fuel tank or liquid container 10 includes one or more quantity/level sensors 12. For example, large commercial aircraft such as the Boeing 747 may use nineteen such sensors. Other applications and containers may use different numbers of sensors or only one sensor.

Each sensor 12 can be of any convenient design that is preferably electrically interrogated. In other words, the particular sensor selected is optional for the designer, but preferably will be a sensor that produces (or is connected to a transducer that produces) an electrical output signal that corresponds to the quantity/level of liquid in the container. One example of many of a commonly used sensor is a capacitive sensor in which a capacitive element changes capacitance value in relation to the percent immersion of the element in the liquid. Such a sensor is described, for example, in U.S. Pat. No. 4,841,227 issued to Maier and commonly owned by the assignee of the present invention, the entire disclosure of which is fully incorporated herein by reference.

The present invention is particularly well suited for use with a dripstick sensor 12 that is commonly used to mechanically read fuel levels in aircraft fuel tanks. In a conventional dripstick design, the dripstick sensor 12 includes an elongated linear body 14 that is vertically mounted in the fuel tank. For bottom mounted dripsticks, a magnetic or ferrous tip 16 is placed at the upper end of the dripstick. A magnetic float 20 in the form of a collar is slidably placed around the elongate body and floats on or near the fuel surface 18. When the ground crew pulls the dripstick body out of the tank, the mechanic can physically sense the position when the tip 16 engages the floating ring 20. Calibrated markings on the dripstick body then provide a visual reading of the fuel level and hence volume in the tank, which information can be used as a confirmation of on-board fuel level readings.

Figure 4:
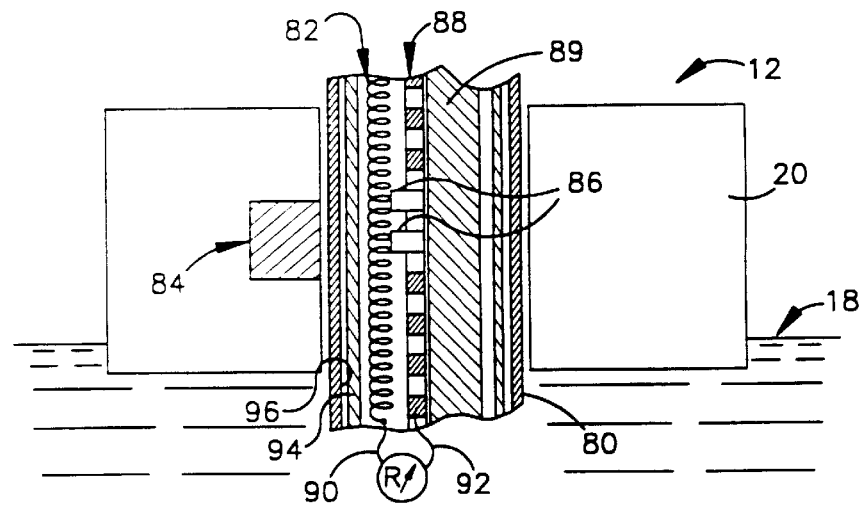
FIG. 4 is a partial cross-sectional view of a dripstick sensor suitable for use with the present invention.

The present invention provides a simple and accurate way to interrogate such a dripstick sensor without the need to mechanically withdraw the dripstick from the fuel tank (as will be more fully explained hereinafter with respect to a sensor such as illustrated in FIG. 4.) The modified dripstick described herein, however, can also be dual configured in a conventional manner for manual withdrawal in case a redundant manual backup system is desired.

More generally, though, the invention contemplates apparatus and methods for interrogating many different types of sensors using a remote hand held unit.

As illustrated in greater detail in FIG. 1B, the sensor 12 (which in this case will be the modified dripstick described hereinafter) is electrically coupled to a sensor electronic control circuit 40. The control circuit 40 may be disposed in a unit that also is used to mount the sensor 12 in the tank. The control circuit 40 includes a circuit that receives electromagnetic energy 32 (FIG. 1A) from a remote control preferably hand held unit 34 and converts this energy to electrical power for the control circuit 40. Thus, on-board electrical power does not need to be connected into the fuel tank, thereby reducing electrical energy in the tank.

The control circuit 40 further includes a circuit that detects the variable parameter of the sensor 12 (e.g. the resistance value or capacitance value as a function of percent immersion) and emits electromagnetic energy 36 having a characteristic that is modulated in relation to the fluid quantity and/or level detected by the sensor 12. For example, the control circuit 40 may emit electromagnetic pulses having a duty cycle or time base modulation that corresponds to the liquid quantity detected. Other modulation and encoding schemes can, of course, be used. The encoded data may further include information in addition to the liquid quantity. For example, the sensor control circuit 40 can be used to encode information such as the type of sensor used, the type of aircraft it is installed in, which sensor corresponds to the particular circuit 40 and so forth. Sensors that detect fuel characteristics other than quantity can also be interrogated if desired. Each sensor control circuit 40 preferably also emits a digital code or protocol so that the data signals can be properly detected and identified.

According to an important aspect of the present invention, the sensor control circuit 40 is remotely energized and, in combination with the remote control unit 34, interrogates the sensor 12. Preferably, the remote unit 34 is a small portable hand held unit easily used by ground crews. When activated, the hand held unit transmits electromagnetic energy 32 to the sensor electronics 40 wherein it is converted and stored as useful electrical energy. This stored electrical energy provides the power needed to energize the sensor 12 and also to energize the circuitry needed to transmit the sensor data and identification back to the hand held unit 34 via the modulated electromagnetic energy 36. A detector circuit in the hand held unit detects the modulated beam 36, demodulates the signal to produce electrical signals containing the desired sensor information and fuel data, and if desired presents the information on a visual display 38 or in another output form.

A system level approach to such apparatus is illustrated in FIGS. 2 and 3. A sensor control circuit is generally indicated with the numeral 40. The sensor control circuit 40 includes one or more signal control lines 42 that connect the control circuit 40 to the sensor 12 (or alternatively a plurality of sensors when the circuit 40 is configured to operate in a multiplexed mode.) The signal control lines 42 may, for example, be used to supply electrical power to a sensor or to receive an output signal from a sensor, or simply to connect a sensor element (such as a variable component) into a detector loop within the circuit 40. The specific nature of the interface of the sensor 12 to the circuit 40 will be determined by the type of sensor being used. In the described embodiment of this invention, the sensor output is essentially a voltage or current that corresponds to the resistance value of the dripstick magnetoresistive element. The sensor 12 output could just as easily be the actual resistance itself of the sensor connected by the leads 42 to an impedance sensitive detector in the control circuit 40. As another example, the circuit 40 could be optically coupled to the sensor 12, or magnetically coupled to the sensor. A direct hard wired connection is not essential depending on the type of sensor being interrogated and the method of interrogation selected. The important aspect is that the circuit 40 is configured to interrogate or determine the sensor 12 output condition after electrical power has been input to the circuit 40 by operation of the hand held unit 34, which condition corresponds to the fuel level or quantity in the tank. Until electrical energy is delivered to the circuit 40 via activation of the remote unit 34, the sensor 12 and the circuit 40 are preferably and substantially de-energized.

As further represented in FIG. 2, the remote unit 34 is remotely connected to the control circuit 40 via the transmitted and received electromagnetic energy signals 32, 36. The remote unit 34 circuitry is appropriately configured to transmit electromagnetic energy, such as for example, photoelectric energy such as infrared light (32) to the control circuit 40, and to receive photoelectric energy such as infrared light (36) from the control circuit 40. The remote control unit 34 is optically linked through air to the control circuit via the light transmission alone, without the use of optic fibers or other light conduits, or electrical connections thereby maximizing the flexibility, portability and simplicity of use of the hand held unit 34. Thus, the term "remote" as used herein refers to electromagnetic coupling without the use of optical or electrical connections between the remote unit and the sensor electronics.

The control circuit 40 may be designed to perform any number of functions depending on the number and type of sensors being interrogated with each circuit 40. However, generally the control circuit 40 will include at least the following functional circuits. An energy receiver, such as a photodiode array 44 is used to receive the electromagnetic energy transmitted from the hand held unit 34, and to convert that energy into useful electrical energy. The type of devices used in the array 44 will, of course, depend on the spectral content of the electromagnetic energy used to link the hand held unit 34 to the control circuit 40. Although infrared light is one of the preferred options it certainly is not the only option available. Broadband radiation such as from white tungsten lamps, radio frequency waves and other spectral bands can be used for the electromagnetic energy. Whatever bandwidth is selected will determine the specific detector 44 used, which must be responsive within the spectral band of the electromagnetic energy transmitted to the control circuit.

In the described example, the diode array 44 produces electrical energy in response to the received light 32. A power storage circuit 46 receives and stores this electrical energy for use in powering the sensor 12 and the circuit 40 under the control of a power control sequencer circuit 48. The sequencer circuit 48 is designed to sequentially control the application of power to the sensor 12 (or sensors in a multiplexed design) via a sensor interface circuit 50. Depending on the overall complexity of the sensor 12 and the circuit 40, the interface circuit 50 may be as simple as a switch, a voltage level shifter, or more involved such as a multiplexer, transducer and so on. Whatever functions are selected for the circuit 40 will be determined primarily by the amount of electrical energy that can be stored and retrieved from the storage circuit 46, and how much of a load the circuit 40 applies to the storage circuit.

The sensor output information is input to an encoder circuit 52 that in turn is connected to an electromagnetic source 54, such as an LED array and driver circuit. In general, the overall electrical load of the circuit 40 is primarily dependent on the power consumption in the LED circuit, especially if the circuit 40 is expected to transmit the sensor data over a long distance to the hand held unit 34. Therefore, sensor data is preferably encoded in a digital manner so that the source 54 can be pulsed rather than continuously operated.

The hand held unit 34 also includes an electromagnetic energy source 56 which for convenience may be an LED and associated driver circuit similar to the control circuit light source circuit 54. However, the remote hand held unit could transmit electromagnetic energy for purposes of energizing the sensor using a different spectral band than is used for the encoded energy transmitted back to the remote unit. A detector circuit 58 is used to receive the encoded signals from the sensor control circuit 40 and to convert those pulses into electrical signals that can be processed and interpreted. The detector circuit 58 can be a simple photodiode or photodiode array or other transducer, and may include signal conditioning circuits for amplification, filtering and other signal processing functions well known to those skilled in the art.

The detector 58 signals are input to a central processing circuit 60 which for convenience may be a control circuit utilizing a microprocessor or similar controller. Discrete logic and signal processing, of course, could also be used. The controller 60 operates a power control circuit 62 that switches the light source 56 on and off at appropriate times. The source 56 is used, as stated, to supply electrical energy to the sensor circuit 40. The source 56 can be designed to be operated continuously during a sensor interrogation operation, or can be turned off when the hand held unit is ready to receive the encoded light pulses.

The controller 60 is programmed in a conventional manner to interpret the received data from the sensor 12 and convert that data into an output, such as the visual display 38 used to display fuel level, quantity, sensor identification, plane identification or any other data transmitted back to the remote unit 34. The controller 60 also monitors an operator interface circuit 64, which may be realized in the form of an alphanumeric keypad optionally provided with special function keys and so forth as is well known. The operator interface can be used, for example, to control actuation of the light source 56, as well as to input control data such as the type of plane, which sensor is being accessed, and so on when such information is not transmitted by the on-board sensor.

With reference now to FIG. 3, a suitable overall system functional flow diagram for the apparatus illustrated in FIG. 2 is provided. Again, this flow diagram is only intended to be exemplary, the actual functions and steps being performed by the fuel gauging system being ultimately determined by the complexity and data requirements specified for a particular application.

At step 70, the controller 60 turns on the energy source 56 as instructed by the mechanic by activation of the hand held unit 34. The source 56 transmits electromagnetic energy towards one of the dripstick sensors by means of the mechanic aiming the hand held unit at the associated sensor control circuit 40. The detector array 44 is exposed to the incident energy, such as through an optical window (not shown) that seals the electronics from the environment exterior to the wing or tank. The control circuit 40 converts the received electromagnetic energy to electrical energy and interrogates the sensor 12. The sensor output is then encoded and transmitted back to the hand held unit via the modulated source 54. Thus, at step 72 the detector circuit 58 receives the encoded signal 36, processes the signals as required, and at step 74 the controller 60 determines the pulse timing characteristics to interpret the sensor 12 outputs. The controller 60 also decodes the data signals with the encoded information such as the dripstick number, aircraft type and so on. At step 76 the controller, by means of appropriate lookup tables and algorithms converts the decoded signals into the desired information such as fuel volume, level, sensor number and so on, and at step 78 displays the requested information to the mechanic via the display 38, which may be a visual display, printed data, recorded data and so forth.

With reference next to FIG. 4, I show a dripstick sensor that has been modified for use with the remote interrogation or direct interrogation by on-board electronics approaches of the present invention. For clarity, FIG. 4 only illustrates the operative portion of the sensor in accordance with my invention that detects the fuel height in the tank. Other parts of the dripstick can be conventional in design and are well known. The sensor 12 includes the elongated member 14 which may be, for example, an aluminum tube 80. Within the tube 80 is a precision wire wound resistor 82 which extends substantially along the entire portion of the tube 80 used for detecting the fuel height or level. The float 20 is disposed around the tube 80 as a collar, and retains an actuation magnet 84. As the float moves up and down in relation to the fuel level 18, the magnet 84 causes spring fingers 86 that are part of a conductive strip 88 to contact the wire resistor 82. A magnetic piece 89 may be provided to insure the fingers 86 return out of contact from the resistor 82 when the float is not aligned with the fingers. One end of the resistor 82 serves as a sensor terminal 90 and the conductive strip 88 serves as another sensor terminal 92. Thus, the resistance between the terminals 90,92 directly corresponds to the percent immersion of the tube 80 in the fuel, or stated another way, directly corresponds to the fuel level/quantity in the tank. An insulative layer 94 can be provided between the tube wall 96 and the internal parts of the magnetoresistive sensor to prevent the tube 80 from electrically short circuiting the resistor 82. This particular sensor 12 can easily be interrogated by simply applying a voltage or current across the terminals 90,92 and determining the resistance value. A particular advantage of this modified dripstick sensor is that it can also be used manually by the ground crew for verifying the fuel level readings as with a conventional dripstick. Thus, the modified dripstick can be used as a direct field replacement for conventional dripsticks. Also, the magnetoresistive element can advantageously be hardwired to the on-board electronics if such monitoring of the dripstick readout is desired.

In FIG. 5, I show one example of a circuit that can conveniently be used for energy conversion and power control in the sensor control circuit 40 with exemplary component values being provided. In this particular arrangement, the detector array 44 is positioned near an optional lens 100 that collimates light energy 32 received from the remote hand held unit 34 through a window 102 which may be flush mounted with the wing underside. The array 44 preferably includes a plurality of photocells 104 that convert incident light energy into voltage and current. The cells could be used in the photovoltaic, photocurrent or both modes. The number of photocells 104 used will be determined by the characteristics of the photocell used, as well as the voltage and charging requirements of the overall control circuit as dictated by the circuit's power requirements needed to interrogate the sensor 12 and transmit encoded light signals back to the hand held unit 34.

The photocells 104 are connected to a circuit charge storage capacitor 106 through a rectifying diode 108. The array 44 is also connected to a LED/Driver (54) storage capacitor 110 through a second rectifying diode 112. Separate storage capacitors are preferred for the LED and control circuit functions due to their respective load effects on the overall charging requirements. For example, the circuit storage capacitor 106 can be smaller in many applications and thus charged quickly for fast access to the sensor 12. Also, by having the LEDs operate from a separate capacitor, the load effects of the LEDs will have less influence on the operation of the control circuit components used to interrogate and encode the sensor 12 data. The LED capacitor 11 stores a DC supply voltage $V^+$ 114 at an output node 116, which is connected to the LED/Driver circuit 54 (FIG. 2). Note that in the preferred embodiment, the DC supply to the LED/Driver 54 is maintained for as long as the capacitor is charged by light received from the remote unit 34, or until the capacitor is discharged by operation of the LED circuit 54. The circuit storage capacitor 106 stores a DC supply voltage that appears at node 118 with respect to the common return 120. A power switch circuit 122 connects the stored energy from the capacitor 106 to a $V^+$ terminal and $V^-$ terminal 126 which are connected to the sensor interface circuit 50 (FIG. 2). The circuit 122 operates in a conventional manner to switch on the output transistor 128 when the voltage stored on the capacitor 106 reaches about +5 VDC, and switches the transistor 128 off when the capacitor 106 discharges to about +2.2 VDC. The switch circuit 122 provides a low impedance output for the circuit voltage supply, and also prevents operation of the control circuitry until sufficient energy is stored in the capacitor 106 to assure accurate data can be transmitted back to the remote unit 34.

In FIG. 5A I show another and simpler circuit that can be used for energy conversion and storage when isolated LED and control circuit supplies are not needed (with like components being given like reference numerals followed by a prime'). In this circuit, the detector array 44' converts the electromagnetic energy into electrical energy that is stored in the main storage capacitor 106' via a rectifying diode 108'. When the stored voltage reaches a predetermined threshold, an output transistor 128' switches on and the supply voltage appears at the V$^+$ and V$^-$ terminals 124', 120' and is connected to the LED/Driver circuit 54' and the sensor interface circuit 50'.

Referring next to FIG. 6 I show a set of circuits (A, B and C) that can conveniently be used to detect the dripstick sensor 12 output and to encode the output for transmission to the remote control unit 34. The V$^+$ and V$^-$ supplies shown in FIG. 6 are connected to the output nodes 124,120 of the supply circuit in FIG. 5. The top circuit in FIG. 6 is a simple voltage scaling circuit that connects the V$^+$ and V$^-$ supplies across a precision reference resistor 140. A reference resistor is used in this case because the sensor 12 of this example is a magnetoresistive sensor having a resistance value that is the parameter of interest. The voltage across the reference resistor 140 produces a reference current that is converted into a negative reference voltage, $-V_{ref}$, by an inverting amplifier 142. A second inverting amplifier 144 configured for unity gain produces a positive reference voltage, $+V_{ref}$.

The middle circuit in FIGS. 6(A, B and C) realizes the sensor interface circuit 50 (FIG. 2) and is used to transduce the sensor 12 output into a useful electrical signal. The V$^+$ and V$^-$ supplies are connected across the sensor resistance via the signal lines 42 (FIGS. 2 and 4). This produces a sensor current, $I_{sensor}$, which is converted to a voltage, $V_{sensor}$, by another amplifier 146.

The voltages $+V_{ref}$, $-V_{sensor}$ and $-V_{ref}$ are input to the lower circuit in FIGS. 6(A, B and C), which realizes the encoder circuit 52 (FIG. 2). The basic function of this particular encoding circuit and encoding scheme is to produce a series of pulses having a time displacement between pulses that corresponds to the sensor 12 output reading. Such a circuit and encoding scheme are fully described in U.S. Pat. Nos. 5,075,631 and 5,077,527 both issued to Patriquin and commonly owned by the assignee of the present invention, the entire disclosures of both patents being fully incorporated herein by reference. Reference to these patents should be made for a detailed explanation of the encoder circuit. Essentially, a ramp generator 150 is used to produce a voltage ramp signal 152. The ramp generator is conveniently realized in the form of an integrator amplifier. The ramp signal 152 is input to one input 154 of a comparator 156. The other input 158 to the comparator 156 is connected to a multiplexer or signal switcher circuit 160 controlled by a timing control circuit 162 which can be realized with a counter. The control circuit 162 sequentially applies the $+V_{ref}$, $-V_{sensor}$ and $-V_{ref}$ to the comparator input 158. The particular sequence only requires that the sensor voltage be applied temporarily between the two reference voltages. The comparator 156 output changes state when the ramp voltage reaches the level of the applied signal to the other comparator input. After the comparator changes state, the control circuit switches in the next signal to the comparator input 158 so that the comparator 158 output is a series of short pulses. The comparator output 162 is connected to the LED/Driver circuit 54 (FIGS. 2 and 8.)

Figure 6D:
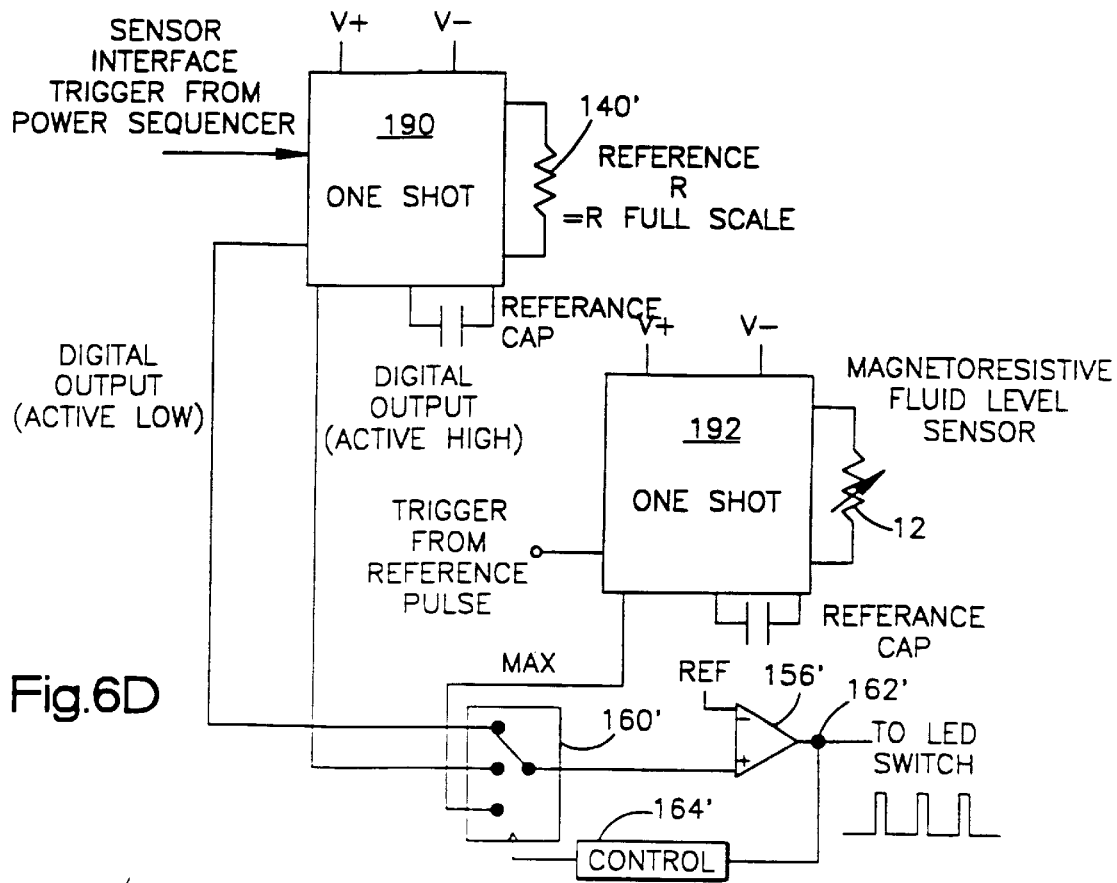
FIG. 6D shows another suitable embodiment for an encoder circuit.
Figure 7:
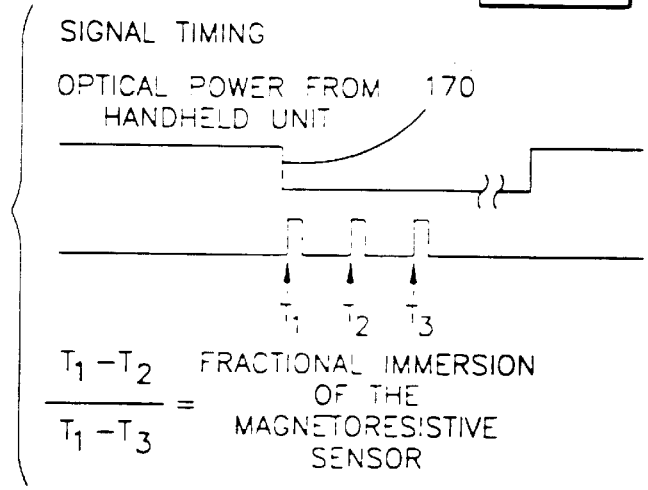
FIG. 7 is a timing diagram showing representative pulses produced by an encoder circuit suitable for use with the present invention.

With reference to FIG. 7, I show a timing diagram for typical pulses output from the encoder circuit of FIG. 6. In this case, the controller 60 (FIG. 2) turns off the light source 56 after sufficient time has passed (as at 170) to charge the storage capacitors 106,110 (FIG. 5.) At time T1, the comparator 156 outputs a first pulse that has a leading edge determined by the value of the $+V_{ref}$ signal. The second pulse has a leading edge at time T2 and this corresponds to the value of the signal $V_{sensor}$. The third pulse has a leading edge at time T3 that is determined by the value of the $-V_{ref}$ signal. Because the ramp voltage $V_{Ramp}$ is a stable constant, and the reference voltages $+V_{ref}$ and $-V_{ref}$ are stable constants, the time delay between the leading edges at T1 and T3 should be a fixed reference time. The time occurrence of leading edge T2 which corresponds to the sensor data will vary with the sensor 12 resistance value and thus correspond to the fuel quantity/level in the tank. Thus, the ratio (T1–T2)/(T1–T3) defines the fractional immersion of the sensor 12 in the fuel.

It will be appreciated by those skilled in the art that in the specific example described herein, leading edge timing is used for encoding. However, other timing sequences can be used just as conveniently.

Figure 8:
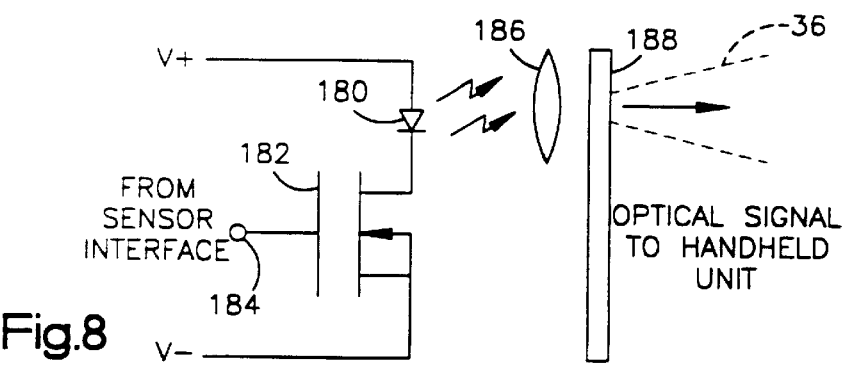
FIG. 8 is a schematic diagram of an LED/Driver circuit for the present invention.

With reference to FIG. 8, 1 show a simple circuit for interfacing the encoder 52 to the LED/Driver circuit 54. The V$^+$ and V$^-$ supplies are connected to the corresponding terminals 116,120 from the storage circuit in FIG. 5. An LED, or alternatively an array of LEDs, are series connected with a switch 182. The switch 182 has a control input 184 that is connected to the output 162 of the encoder comparator 156. Thus, the switch 182 is pulsed on and off by the encoded pulses from the comparator 156, thus correspondingly pulsing the LED 180 on and off. A lens 186 collimates the light from the LED 184 and transmits the light pulses through a window 188 towards the hand held unit. The lens and window are, of course, optional depending on the particular application.

With reference to FIG. 6D I show another embodiment (with like components being given like reference numerals followed by a prime') for an encoder circuit suitable for use with my invention. In this example, I still use an output comparator 156' to produce a series of pulses having a time domain displacement that corresponds to the sensor 12 output data. A control circuit 162' is used to switch sequentially to the comparator (by means of a switching circuit 160') signals from a pair of one shot timers 190,192. The first one shot produces a pulse edge at a time that corresponds to a reference resistor 140', and the second one shot 192 produces a pulse edge that corresponds to the sensor 12 resistance value. The first one shot may be armed from a signal produced by the energy storage circuit 46 (FIG. 5), and the second one shot armed by the pulse produced by the reference one shot. As in the other described embodiment, the comparator output 162' is a series of pulses encoded with the sensor 12 reading.

As described hereinbefore, the hand held unit 34 includes appropriate circuitry for transducing the encoded light received from the control circuit 40 by means of the detector circuit 58. The controller 60 can be easily programmed to calculate the ratio (T1–T2)/(T1–T3) to determine the fuel level and quantity.

Although not shown in detail in the Figures, the encoder circuit 52 may include a second or more ramp generator(s) and associated circuitry to generate a pulse series that encodes identification data such as the sensor 12 number, location, plane identifier and so on. Alternatively, the encoder could transmit one or more digital words (for example by use of a programmable ROM or other memory device) to the hand held unit 34 before the sensor data is transmitted, with the digital words being encoded data of interest to the ground crew.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A sensor for detecting liquid level comprising an elongate body disposable in the liquid, a float adapted to slide along said body in relation to level of the liquid, said float comprising first magnetic means for actuating a second magnetic means inside said body for producing a sensor output related to the liquid level; said second magnetic means comprises a magnetoresistive sensor means having a sensor resistance connected to two sensor terminals wherein said sensor resistance between said terminals varies in relation to position of said float; and encoder means coupled to said terminals for detecting said sensor resistance and converting said detected sensor resistance into an output that is characterized by a series of pulses having a timing relationship between said pulses, with said timing relationship corresponding to the liquid level.

2. The sensor of claim 1 wherein said magnetoresistive means comprises a linear resistive element and contact means magnetically actuated by said first magnetic means for changing resistance of said element.

3. The apparatus of claim 1 wherein said series of pulses comprises at least three pulses including first and second reference pulses, and a liquid level pulse that occurs in time between said reference pulses.

4. The apparatus of claim 3 wherein said first reference pulse occurs at time T1, said second reference pulse occurs at time T3, and said liquid level pulse occurs at time T2, wherein liquid level is obtained by the ratio [T1–T2]/[T2–T3].

5. The apparatus of claim 4 comprising an electromagnetic transmitting device, wherein said pulses are used to activate said electromagnetic device for transmitting through free space electromagnetic energy in pulses having a timing relationship that corresponds to the timing relationships between said reference and liquid level pulses.

6. The apparatus of claim 1 wherein said encoder means comprises a voltage source connected to a reference resistor that produces a reference current in relation to said voltage source; said voltage source also being connected to said sensor resistance to produce a sensor current; said encoder means further comprising comparison means for comparing said reference current and said sensor current to a time variant signal to produce said pulses.

7. The apparatus of claim 6 wherein said voltage source is energized by electromagnetic energy transmitted through free space received at the sensor, the sensor comprising power supply means for converting said received electromagnetic energy into electrical energy for said voltage source.

8. The apparatus of claim 6 wherein said comparison means comprises means for converting said reference current into first and second reference voltages and for converting said sensor current into a sensor voltage; said comparison means producing a first reference pulse based on said first reference voltage, a second reference pulse based on said second reference voltage, and a liquid level pulse based on said sensor voltage; wherein said liquid level pulse occurs in time between said reference pulses.

9. The apparatus of claim 8 wherein said time variant signal is a ramped voltage signal, said comparison means further comprising a comparator having one input connected to said ramped voltage signal, and a second input selectively connected by a switching means to said first and second reference voltages and sensor voltage.

* * * * *